Aug. 24, 1965  T. E. ANDREWS  3,202,799
CONTROL MECHANISM FOR A TOASTER OR SIMILAR APPLIANCE
Filed March 29, 1963  3 Sheets-Sheet 1

Inventor:
Theodore E. Andrews,
by Laurence R. Kempton
His Attorney

Aug. 24, 1965

T. E. ANDREWS 3,202,799

CONTROL MECHANISM FOR A TOASTER OR SIMILAR APPLIANCE

Filed March 29, 1963

Inventor:
Theodore E. Andrews,
by Laurence R. Kempton
His Attorney

Aug. 24, 1965  T. E. ANDREWS  3,202,799
CONTROL MECHANISM FOR A TOASTER OR SIMILAR APPLIANCE
Filed March 29, 1963  3 Sheets-Sheet 3

Inventor:
Theodore E. Andrews
by Laurence R. Kempton
His Attorney

United States Patent Office 3,202,799
Patented Aug. 24, 1965

3,202,799
CONTROL MECHANISM FOR A TOASTER OR SIMILAR APPLIANCE
Theodore E. Andrews, Orefield, Pa., assignor to General Electric Company, a corporation of New York
Filed Mar. 29, 1963, Ser. No. 268,894
11 Claims. (Cl. 219—492)

This invention relates to a control mechanism for a toaster or similar appliance and more particularly to an integrated assembly including a timer of the heat-up, cool-down type, control switches therefor, and associated power terminals.

A timing mechanism which utilizes the movement of a relatively inexpensive bimetallic element caused by the heating and cooling of the element to measure the duration of an operation such as a toasting cycle is a convenient and reliable device. It can be constructed to provide relatively accurate control over a wide range of temperature settings. One advantage of the heat-up, cool-down type of timer in a toaster as opposed to a device which senses the temperature of the toast surface to determine the duration of the toasting cycle is that the thermal timer may be remotely positioned from the toaster heating elements. However, it is desirable that an appliance, such as a toaster, be made as compact as possible; and since there are a considerable number of individual elements associated with a heat-up, cool-down timer, it is somewhat of a problem to adapt such timers and their associated control to conveniently fit within the limited spaces which may be available with various types of toasters.

It is a primary object of this invention to provide an improved control mechanism including an electric timer of the heat-up, cool-down variety for use with an electric toaster or similar appliance.

It is another object of this invention to provide an improved appliance control mechanism having uniquely arranged power terminals and switch components requiring a minimum of space.

It is another object of the invention to provide an extremely compact, low cost, toaster control mechanism including a thermal timer, switches therefor, and associated power terminals.

In accordance with a preferred embodiment of the invention, the control mechanism includes a main switch and control therefor and a thermal timer comprising a bimetallic element pivotally mounted at one end to a plate-like support, a heater for heating the bimetallic element, and a shorting switch for bypassing the heater. The heater and switch combination are serially connected with the main heating element of the appliance and with the main switch to control the energization of the main heating element. The main switch is closed by manual operation of an operating lever mounted on the support. A latch mechanism also mounted on the support holds the operating lever in the "on" position. When the main switch is closed the shorting switch is initially open so that line current flow through the heater for the bimetallic element. As the bimetallic element is heated it flexes causing the bypass or shorting switch to be closed. Once the shorting switch is closed, the bimetallic element is no longer heated causing the element to cool and to begin to return to its original shape. Means are provided to utilize the force produced by the cooling of the bimetallic element to unlatch the operating lever, thus opening the main switch and terminating the toasting cycle. To assist in making the mechanism compact, all components are mounted on the single support and the operating lever and switch contacts are uniquely arranged to minimize the number of parts required.

Further features, objects and advantages will become apparent with reference to the following drawings in which.

Figure 1:
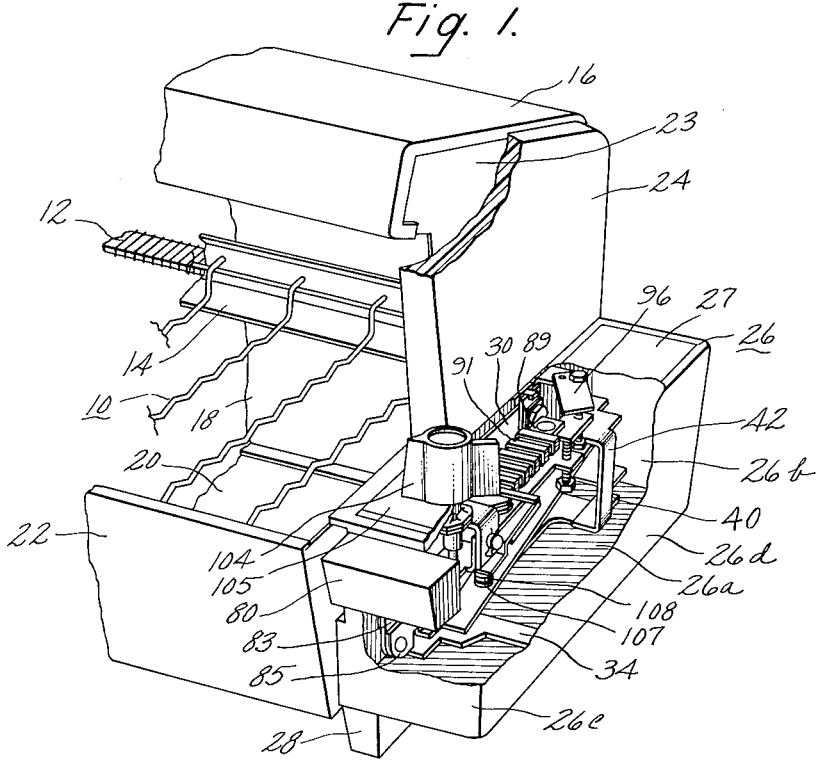
FIG. 1 is a front perspective view of a portion of a toaster with a portion of the toasting cycle control mechanism embodying the invention.

Referring now to the drawings, there is shown in FIG. 1 a portion of a toasting appliance having a horizontally disposed bread supporting rack 10 supported within a partially open housing which permits food to be easily placed on and removed from the rack. The toaster is provided with a heating element 12, partially shown in FIG. 1, which is positioned at the rear of the rack and in substantially the same plane as the rack. A shield 14 positioned between the rack and the heater prevents radiant energy from emanating directly onto the rack area. Heat is transmitted to the rack area by reflection off a plurality of reflecting surfaces positioned within the outer shell 16 and by means of a lower reflection system including surfaces 18, 20, and the interior surface of front wall 22. The foregoing components are assembled to a metal end plate 23, a plastic upper end member 24 and lower support member 26. Support member 26 forms a control box which has a bottom 26a with legs 28, a back 26b, a front 26c and one side 26d. A control box cover 27 fits on top of the control box 26. Although not shown, it should be understood that the opposite end of the toaster is provided with similar members for supporting and carrying the appliance; however, the counterpart to member 26 does not have a hollow portion in that the entire control mechanism is located in the box 26, and the member may be molded as an integral unit.

Since the bread or other food to be toasted is simply placed onto the rack 10 into the position wherein it is toasted and removed directly by the operator at the completion of the toasting cycle, a carriage or other bread moving mechanism is not required. Accordingly, to control the operation of the toaster, it is only necessary to provide a timing device to obtain automatic toast operation and a manual control for initiating the toasting operation, and for interrupting the toasting cycle if desired. In accordance with the invention, the entire control mechanism has been compactly positioned adjacent the one end of the toaster shown in FIG. 1. Moreover, all of the various parts and elements of the mechanism have been assembled as one unit to simplify manufacturing and repair operations.

Figure 2:
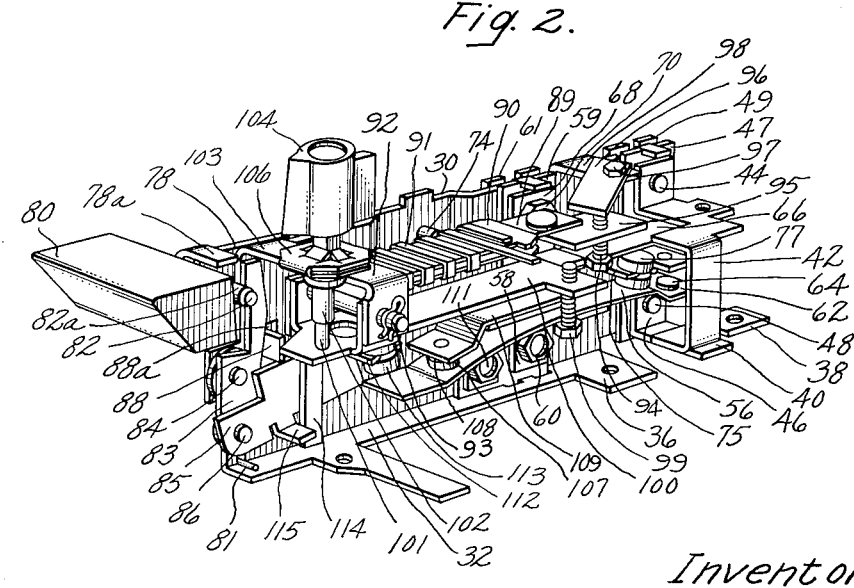
FIG. 2 is an enlarged perspective view of the control mechanism of FIG. 1.

Referring now to FIG. 2, the toaster control mechanism may be seen to include a plate-like sheet metal support 30 whose primary surface is positioned in substantially parallel relation to end plate 23 and member 24 and in substantially perpendicular relation to the toaster rack 10. Support 30 also includes a horizontally extending portion 32 having projections 34 and 36 which contain threaded apertures utilized to connect the support to the main toaster structure.

Power may be connected to the toaster by means of a pair of terminals 38 and 40 mounted in insulated relation on support 30. Terminal 38 is the horizontal end portion of an irregularly shaped metal member 42 having its opposite end attached to plate 30 by means of a suitable fastener 44. Terminal 40 is the horizontally extending portion of a U-shaped angular member 46 having its closed end vertical portion mounted on plate 30 by means of a suitable fastener 48. The terminal members are mounted in vertically spaced relation to minimize the space requirements. Sections 47 and 49, FIG. 2, insulate the terminal members from plate 30 and may be identical in size to simplify manufacturing.

Each of the terminals is provided with a threaded aperture, as may be seen for example on terminal 38, to facilitate connection with the wires of an electric power cord. In accordance with the invention, it should be noted that terminals 38 and 40 are positioned in close relation adjacent the rear of the bottom wall of control box 26. With such an arrangement, the wires of the power cord may be directly connected to the terminals, thus eliminating the need for any interconnecting wires. A power cord could, of course, be brought further into the control box should be terminals be positioned elsewhere. However, Underwriters Laboratories has a relatively low temperature limit on the insulation materials commonly used for toaster power cords. Accordingly, if the cord had to be extended into the toaster an appreciable distance, this temperature limit might be exceeded. In such event, it would be necessary to resort to connecting wires covered with asbestos or other high temperature insulation. Naturally, such an arrangement would be more costly than the unique construction of the invention. Also, by providing suitable openings (not shown) in the lower wall 26a of control box 26, the cord wires may be easily connected after the box has been assembled to the toaster.

The toaster is provided with a double pole main switch which assures added safety to the user by completely disconnecting the toaster circuit from the power line when the toaster is not in operation. One pole of the main switch includes a fixed contact 50, best seen in FIGS. 3–5, mounted on the lower side of the upper horizontally extending leg of terminal member 46. The other pole of the switch includes a fixed contact 54 mounted above contact 50 on the lower side of a horizontal portion of terminal member 42.

To cooperate with the fixed contacts of the main switch, there is provided a pair of flexible contact arms mounted in insulated relation on support 30. A first flexible contact arm 56 may be seen to be mounted at a point intermediate its ends on the horizontal portion of an angular member 58 having its vertical portion secured to support 30 by a suitable fastener 60. It can be seen that arm 56 extends in substantially perpendicular relation to the support and has mounted on its rearwardly extending end 62 a movable contact 64. Contact arm 56 is so biased and mounted that contact 64 is normally urged into engagement with the fixed contact 50. A second flexible contact arm 66 has one end suitably secured to the horizontal portion of angular member 68 whose vertically extending portion is secured by suitable fastener 70 to support 30. The angular members 58 and 68 are insulated from support 30 by a pair of identical insulating sections 59 and 61. On the movable end of arm 66 there is mounted a contact 72 which cooperates with fixed contact 54. Arm 66 is so mounted and biased that contact 72 is normally spaced from fixed contact 54.

The compact manner in which the components of the main switch have been mounted on the support 30 should be particularly noted. The flexible contact arms 56 and 66 are vertically spaced from each other in roughly parallel relation closely adjacent to support 30 so that the width of the control mechanism is minimized. Further, by mounting the switch components on the support plate 30 the front to rear dimension of the control mechanism is also minimized.

Figure 6:
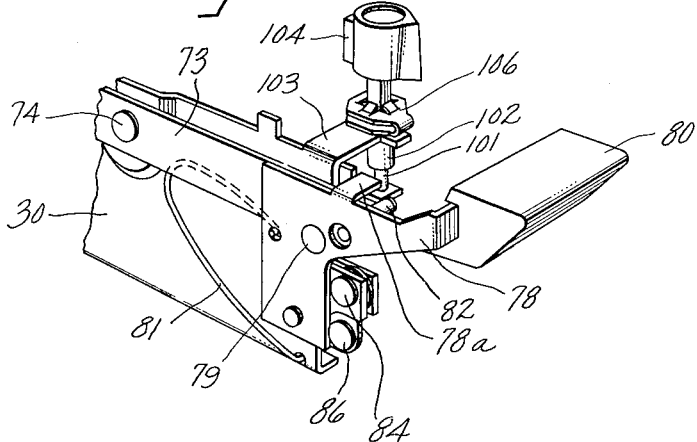
FIG. 6 is a perspective view of a portion of the control mechanism showing the mounting arrangement of a control lever.

To control the operation of the main switch and thus the toasting cycle, there is provided an operating lever 73 pivotally mounted on pin 74 perpendicularly positioned in support 30 and extending between the support and the main toaster structure, as best seen in FIG. 6. Operating lever 73 is an elongated plate-like member which extends from the front portion of support 30 rearwardly to a point where a horizontally extending projection 75 extends through an aperture 76 in support plate 30. Projection 75 has a bifurcated end carrying an insulated button 77 having an upper surface for cooperating with arm 66 and a lower surface for cooperating with contact arm 56.

To move the operating lever 73, there is provided a manually controllable lever 78 pivotally mounted by pin 79 on operating lever 73. Manual control button 80 attached to the end of lever 78 provides an external means of operating the toaster. Control lever 78 is urged to move in a clockwise direction, as viewed in FIG. 6, by means of spring 81 having one end extending through an opening in lever 78 and having its other end attached to support 30. However, lever 79 is also provided with a projection 78a extending above one end of lever 73. The force produced by spring 81 urges projection 78a into engagement with the upper edge of lever 73 with the result that levers 73 and 78 are urged to move as a unit in a counterclockwise direction about pivot 74 as viewed in FIG. 6, or, in other words, spring 81, in effect, urges button 80 upwardly.

Figure 3:
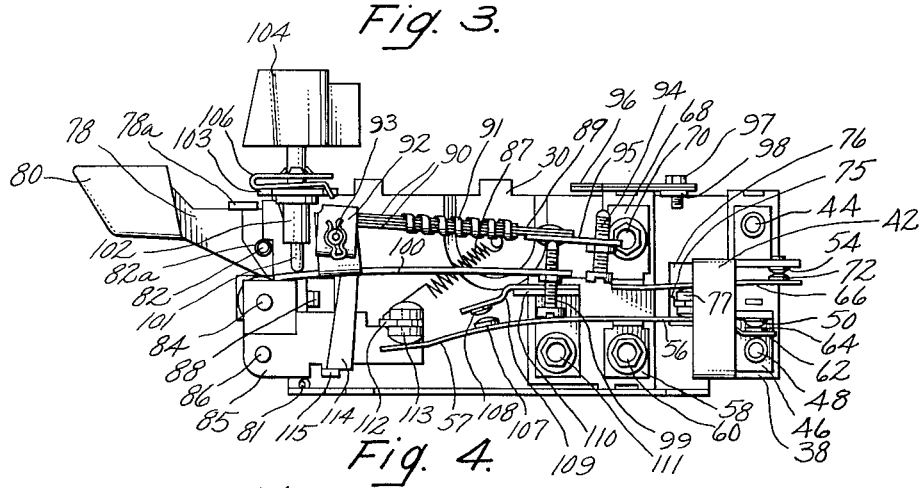
FIG. 3 is a side elevational view of the control mechanism with the various parts shown in the position assumed at the initiation of the toasting cycle.
Figure 5:
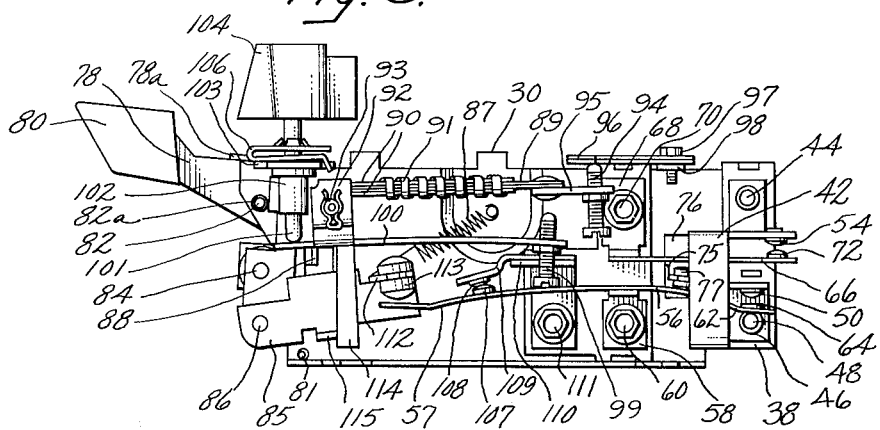
FIG. 5 shows the mechanism of FIG. 3 at the completion of a toasting cycle.

When lever 73 is urged into its extreme counterclockwise position, as viewed in FIG. 6, and button 80 is in its normal upper position, insulated button 77 on projection 75 of lever 73 is in the position shown in FIGS. 2 and 5, wherein the lower surface of the projection engages contact arm 56 so that movable contact 64 is not engaging fixed contact 50, and the upper surface of button 77 is spaced from contact arm 66 so that the resiliency of arm 66 holds its movable contact 72 away from fixed contact 54. In other words, the main switch is open. To close the main switch, button 80 is depressed causing lever 78 and lever 73 to move in a clockwise direction about pivot 74, as viewed in FIG. 6, which in turn causes projection 75 and insulated button 77 to move upwardly so that the resiliency of contact arm 56 is permitted to move contact 64 into engagement with fixed contact 50 and so that the upper surface of button 77 engages contact arm 66 forcing movable contact 72 into engagement with fixed contact 54. Such condition is shown in FIG. 3.

To hold operating lever 73 in the position where the main switch is closed, the lever is provided with a pin 82 which extends in perpendicular relation to lever 73 and support 30 adjacent the forward edge of support 30. Pin 82 carries a roller 82a which cooperates with a latch lever 83 pivotally mounted at 84 on the opposite side of support 30. Roller 82a reduces wear and provides smoother latching and unlatching. A bell crank lever 85 is pivotally mounted at 86 to the lower end of latch lever 83. Spring 87 is connected to the end of bell crank lever 85 opposite from its pivot 86. The other end of the spring 87 is connected to the support 30 at pin 74, which as mentioned above, is also the pivot point for lever 73. Spring 87 provides a tension force on bell crank 85 which urges latch lever 83 into latching engagement with pin 82 and its roller 82a. Thus, it can be realized that by depressing button 80 the main switch is closed by means of operating lever 73 and held in this closed position by means of pin 82 and latch lever 83.

It is desirable that the main switch can be manually opened to terminate the toasting cycle whenever desired. To accomplish this result it is only necessary to move manual control button 80 upwardly to force pin 82 out of latching engagement with latch lever 83. When an upward force is produced on button 80, control lever 78 moves in a counterclockwise direction about pivot 79, as viewed in FIG. 6, and a clockwise direction about pivot pin 79, as viewed in FIGS. 2–5. Such motion is permitted without immediately moving operating lever 73 inasmuch as projection 78a on lever 78 only engages the upper edge of lever 73 when button 80 is depressed.

The interrupt function is accomplished by the clockwise rotation of 78 (FIGS. 2–5) which causes tab 78a to engage the top of latch 83 which, in turn, causes latch 83 to rotate clockwise (FIGS. 2–5) about pivot 84, thus releasing latch pin 82 and operating lever 73.

Incidentally, the upward movement of button 80 and the resulting pivotal movement of lever 78 about pin 79 is limited by the engagement of a portion of lever 73 with spring 81 in the area where spring 81 engages lever 78. More specifically, the end portion of spring 81 engages projection 88 on lever 73 which extends through an opening 88a, FIG. 2, in support 30. The function of projection 88 will be described hereinafter.

By connecting the main heater 12 of the toaster in series with the main switch, the toaster may be operated by the manual control mechanism which has heretofore been described. However, it is highly desirable that a toasting cycle be automatically terminated when the toast has reached a desired amount of brownness. For this purpose, there is provided a thermal timer of the heat-up, cool-down type. Such a timer is particularly suited for use with a low cost toaster of the type shown in FIG. 1. To make such a toaster as compact as possible, the timer has been, in accordance with the invention, incorporated and combined with the control and switch structure heretofore described and the entire mechanism is mounted on the support 30.

The timer mechanism comprises a bimetallic heater assembly, a toast color control mechanism, an ambient temperature compensator, a shorting switch, and the bell crank lever 85. The bimetallic heater assembly includes a normally flat bimetallic arm 89, substantially covered by insulating strips 90, and a heating element 91 wound around the arm 89 and the insulators 90. One end of the bimetallic arm 89 is affixed to a U-shaped bracket 92 which is pivotally mounted on shaft 93 affixed to support 30. A screw 94 is threadedly received in a plate 95 attached to the opposite end of bimetallic arm 89, which is free to move arcuately about shaft 93.

Figure 4:
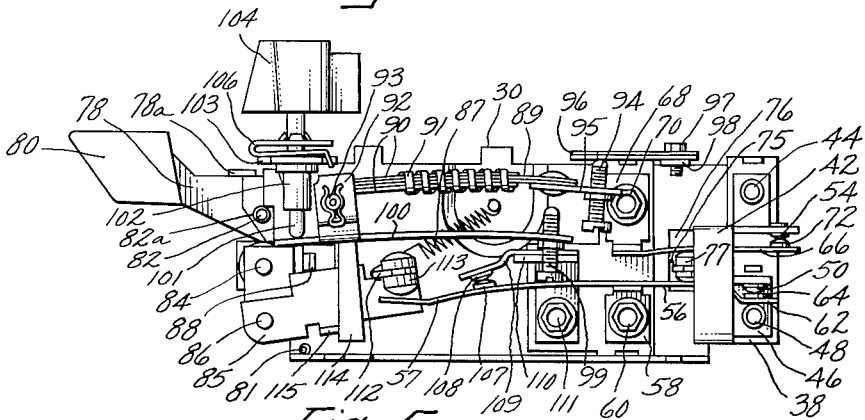
FIG. 4 shows the mechanism of FIG. 3 with the shorting switch closed and the main switch closed.

When the bimetallic arm 89 moves in a counterclockwise direction, as viewed in FIGS. 3 and 4, the tip of screw 94 engages the end portion of a second bimetallic arm 96 having its opposite end mounted by means of a fastener 97 to projection 98 extending from support 30. Bimetallic element 96 forms an ambient temperature compensator. This is accomplished by virtue of the fact that the bimetallic arm 89 has its high expansion side facing upward so that when heated it will bow in the upward direction and the bimetallic arm 96 also has its high expansion side facing upward and is therefore adapted, when heated to bend downwardly toward the cool-down screw 94. Thus, it can be seen that the bimetallic arm 96 in combination with screw 94 provides an adjustable cool-down stop for the bimetallic heater assembly.

A heat-up stop in the form of a screw 99 is threadedly mounted in a support arm 100, which is pivotally mounted on shaft 93. Heat-up screw 99 provides a support for the free end of bimetallic arm 89 as it is heating. The opposite end of support arm 100 cooperates with a color control adjusting mechanism which includes a screw 101 threadedly mounted in an insert 102 carried by horizontal projection 103 of support 30. A color control knob 104 mounted on the upper end of screw 101 provides a manual adjustment for the color setting. A color control plate or escutcheon 105, as seen in FIG. 1, having suitable indicia marked thereon may be provided for cooperation with the color control knob 104. A spring clip 106 prevents slippage of the adjusting screw 101 and further cooperates with projection 103 to limit the rotation of screw 101. It will be appreciated that rotation of the color control knob 104 moves the heat-up screw 99 arcuately about the shaft 93, to either raise or lower the heat-up screw 99 with respect to the bimetallic arm 89.

The toasting time interval is of course to be measured by the heat-up time and the cool-down time of the bimetallic arm 89. To terminate the heating portion of this time interval, there is provided a shorting switch which is connected in shunting relation with bimetallic heater 91 so that when the switch is closed the heater is short circuited. This switch has been partially and uniquely combined with flexible contact arm 56 by positioning a movable contact 107 on the flexible contact arm 56 at a point on the opposite side of the angular support 54 from movable contact 64. Contact 107 is adapted to cooperate with contact 108 mounted on the movable end of a short flexible arm 109 attached to a horizontally extending portion of angle member 110 which is secured at its vertically extending portion in insulating relation on support 30 by insulating sections 59 and 61 and by a suitable fastener 111. The contact arms 109 and 56 are biased in such fashion that contacts 107 and 108 are normally in engagement so that the shorting switch is normally closed.

To open the shorting switch, the bell crank 85 is provided with a horizontal tab extension 112 having a bifurcated end adapted to hold a ceramic button 113 suitable for cooperating with the end 57 of contact arm 56. By depressing manual button 80, projection 88 of lever 73 is moved downward engaging the upper edge of bell crank 85 and pivoting the crank to open the shorting switch. As previously explained, spring 87 is attached to bell crank 85, and the line of force is such that the spring urges button 113 out of engagement with end 57 of contact arm 56. Accordingly, it is necessary to provide some additional means to hold the bell crank in a manner such that the shorting switch can be held in an open position when button 80 is released. For this purpose, one side of the U-shaped bracket 92 is extended downwardly to form an actuating arm 114 which will pivot about shaft 92 whenever the bimetallic arm 89 moves, as when the bimetallic arm goes upwardly under the influence of its heating element 91. When bell crank 85 is moved in a clockwise direction, as viewed in FIG. 3, about its pivot 86, the bimetallic arm assembly will move by its own weight in a clockwise direction until arm 89 contacts heat-up screw 99. Such movement causes arm 114 to limit movement of bell crank 85 in a counterclockwise direction by virtue of the lower end of arm 114 engaging tab 115 projecting from bell crank 85. In this condition, the shorting switch is held in open position as shown in FIG. 3.

Figure 7:
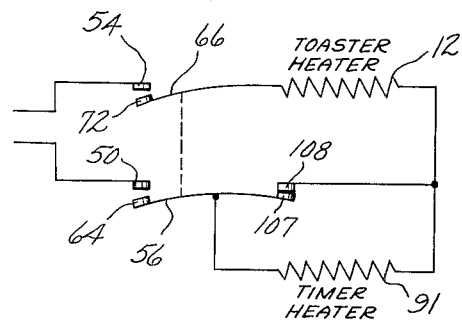
FIG. 7 is a circuit diagram of a toaster.

Before giving a summary of the operation of the control mechanism, it may be helpful to refer to the circuit diagram of FIG. 7. It can be seen that the main toaster heater 12 and the timer heater 91 are serially connected with the two-pole main switch including contacts 54, 72, 50 and 64. The shorting switch 107, 108 is connected in parallel with heater 91 to bypass the heater when closed. To simplify the illustrations of the control mechanism in FIGS. 1–5, the wires connecting the various switch terminals and heater elements have not been shown on FIGS. 1–6. However, it should be understood that the connections are to be made as shown in FIG. 7. Quickly reviewing such connections, terminals 38 and 40 are to be connected to the wires of a power cord; one end of the main heating element 12 may be connected by fastener 70 to angular member 68; the other end of heating element 12 may be connected by fastener 111 to angular member 110; one end of heating element 91 may also be connected to angular member 110 by means of fastener 111; and the opposite end of bimetallic heating element 91 may be connected to angular member 58 by means of fastener 60.

The operation of the toaster is as follows: referring first to FIG. 2 the control elements are shown in a position prior to the initiation of a toasting cycle. It should be noted that pin 82 of operating lever 73 is not restrained by latch lever 83; the main switch contacts are in open position; the shorting switch contacts are closed in that bell crank lever 85 is in its extreme counterclockwise position in response to the urging of spring 87; and arm 114 does not engage the upper surface of the tab 115. To initiate operation of the toasting cycle, push button 80 is depressed causing button 80, and levers 78 and 73 to pivot as a unit about pivot pin 74. This causes ceramic button 77 on the end 75 of operating lever 73 to be moved upwardly permitting contact arm 56 to move upwardly so that contact 64 can engage contact 50 and causing contact arm 66 to move upwardly so that contact 72 engages contact 54. Thus, the main switch is closed and heating element 12 begins to heat. At the same time, projection 88 of operating lever 73 engages the upper surface of bell crank 85 moving the bell crank in a clockwise direction as viewed in FIGS. 2 and 3 causing ceramic button 113 to depress the end 57 of flexible contact arm 56, thus moving contact 107 away from 108 to open the shorting switch. As bell crank 85 is moved in a clockwise direction sufficiently far so that tab 115 no longer restrains the clockwise movement of arm 114, bimetallic arm 89 pivots about shaft 93 until the free end of the arm engages screw 99. Such action moves arm 114 over tab 115 so that when manual control button 80 is released, the counterclockwise movement of bell crank 85 in response to the urging of spring 87 and flexible arm 56 is limited by the engagement between the lower end of arm 114 and the upper surface of tab 115. Simultaneously, latch lever 83 is held in a position to engage pin 82 and hold the operating lever 73 in the "on" position. The control mechanism is shown in the foregoing condition in FIG. 3.

Since the shorting switch is open in the condition of FIG. 3, the heater 91 for the bimetallic heating element 89 is energized and begins to raise the temperature of the bimetallic arm 89. As the arm begins to heat it bows upwardly causing the U-shaped bracket 92 to rotate in a counterclockwise direction about shaft 93 as viewed in FIGS. 3 and 4 while the free end of bimetallic arm 89 remains in contact with heat-up screw 99. After sufficient movement of arm 114 in a counterclockwise direction the left-hand edge of arm 114, as viewed in FIGS. 3 and 4, slips over the right-hand edge of tab 115 to the condition shown in FIG. 5. Immediately, bell crank 85 is moved in a counterclockwise direction about pivot 86 in response to the urging of spring 87 and the urging of flexible contact arm 56. This permits flexible contact arm 56 to move upwardly a sufficient amount to close the shorting switch contacts 107 and 108, thus de-energizing heating element 91. This causes bimetallic arm 89 to begin to cool; however, since arm 114 is now in interference with the right-hand edge of tab 115, as shown in FIG. 5, arm 114 is temporarily restrained. Instead, the free end of bimetallic arm 91 moves upwardly as the arm begins to straighten until the cool-down screw 94 engages bimetallic arm 96 of the ambient temperature compensator, as shown in FIG. 5. Since the cool-down screw 94 prevents any further movement of the bimetallic contact arm in this direction, the further cooling of the bimetallic arm 89 produces a force through arm 114 on tab 115. This force opposes the force produced by spring 87 to move bell crank 85 causing latch lever 83 to pivot about pin 84 in a clockwise direction as viewed in FIGS. 4 and 5 until the pin 82 is released from latch lever 83. Consequently, button 80, operating lever 73 and control lever 78 pivot as a unit about pin 74 to the "off" position causing the main switch contacts to be opened and thus terminating a toasting cycle. The various elements are returned to the position of FIGS. 2 and 5.

Since the bimetallic arm 89 is once more cool, a second toasting operation can be immediately initiated if so desired. As the ambient temperature inside the toaster increases after repeated operations, the toast cooks to a given color in a shorter period of time. In order to automatically compensate for this bimetallic arm 96 when heated, moves downwardly thereby reducing the free deflection period of the cool-down screw 94 at the end of bimetallic arm 89, thus terminating the toasting operation earlier than at lower ambient temperatures.

The foregoing description should provide an understanding of the heat-up, cool-down timer as well as the other features of the over-all combined switch and control mechanism. To obtain a more detailed understanding of the temperature changes required to obtain the necessary movement of the bimetallic arm and to obtain a further understanding of the characteristics of the bimetallic elements which must be considered to obtain optimum performance, reference may be made to U.S. Patent 2,969,010 by T. E. Andrews et al.

As a unique feature of the present invention it should be noted that the heat-up, cool-down timer including its adjustable toasting control and ambient temperature compensator, the main switch, and power terminals, the shorting switch, the operating lever and its associated manual control are compactly and integrally assembled on the single support member 30. It should also be noted that the entire control mechanism fits within the housing 26 as shown in FIG. 1. It can also be seen from FIG. 1 that the switch flexible contact arms, the two bimetallic arms, and the toasting adjusting arm are all arranged in vertically spaced relation so that the over-all width of the mechanism is no greater than a convenient width for the manual control button 80.

While a specific embodiment of the invention has been described in the foregoing paragraphs, it is to be understood that certain changes may be made in such construction without departing from the scope of the invention. Accordingly, it is intended that all matter contained in the foregoing description and shown in the accompanying drawings shall be interpreted as illustrative and not in a limited sense in determining the scope of the following claims.

What is claimed is:

1. In a toaster of the type having a substantially horizontal food supporting rack, heating means for providing heat to the rack area, a mechanism for controlling the duration and initiation of the toasting cycle positioned adjacent one end of the rack comprising: a plate-like support vertically positioned and extending in substantially perpendicular relation to said rack, an operating lever pivotally mounted on said support having an "off" and an "on" position, spring means urging said operating lever into the "off" position, manual means for depressing said operating lever to move the lever into the "on" position, latch means for holding said operating lever in the "on" position, means forming a pivotal axis extending in perpendicular relation to said support, an elongated bimetallic element pivoted at one end to the means forming the pivotal axis, stop means mounted on said support adjacent the upper end of said element, means for heating said bimetallic element, a main switch for controlling the energization of said bimetallic heating means and said toaster heating means, means formed on said operating lever for controlling said switch, said bimetallic element when heated bowing into an arc between said pivotal axis and said stop means, a shorting switch for de-energizing said bimetallic heating means, means mounted on said support to control said shorting switch, means attached to the pivoted end of said bimetallic element for actuating said shorting switch controlling means after the actuating means is pivoted through a given angle, means for holding said actuating means at said given angle, said stop by developed in said actuating means due to the further cooling of said bimetallic element to thus actuate said latching means releasing the operating lever permitting said main heater to open and thus de-energizing said toaster heating means.

4. In a toaster of the type having a substantially horizontal food supporting rack, heating means for providing heat to the rack area, a mechanism for controlling the duration and initiation of the toasting cycle comprising: a plate-like support vertically positioned and extending in substantially perpendicular relation to said rack adjacent one end of the rack and said heating means, an operating lever pivotally mounted on said support having a heater "off" and a heater "on" position, spring means urging said operating lever into the heater "off" position, manual means for depressing said operating lever to move the lever into the heater "on" position, latch means for holding said operating lever in the heater "on" position, an elongated bimetallic element pivoted at one end to said support, stop means mounted on said support adjacent the upper end of said element, means for heating said bimetallic element, a main switch for controlling the energization of said bimetallic heating means and said toaster heating means, said switch including a flexible arm mounted in insulated relation on said support and a contact mounted on one end of said contact arm, means formed on said operating lever for controlling said switch, said bimetallic element when heated bowing into an arc between its pivoted end and said stop means, a shorting switch for de-energizing said bimetallic heating means and including a contact mounted on the opposite end of said contact arm, means responsive to the heating and bowing of said bimetallic element to close said shorting switch, said stop means being adapted to restrain the pivotal movement of said other end of said bimetallic element during the cooling thereof, and means responsive to the force developed by the cooling of said bimetallic element to unlatch said latching means releasing the operating lever permitting said main heater to open and thus de-energizing said toaster heating means.

5. In an electric appliance, a mechanism for controlling the appliance operation comprising: a support, a double pole main switch for controlling the energization of said appliance, said main switch including a first flexible contact arm mounted in insulated relation on said support, a first movable contact mounted on one end of said first arm, a first fixed contact mounted in insulated relation on said support to cooperate with said first movable contact, said first arm being biased such that said first movable contact normally engages said first fixed contact, a second flexible contact arm mounted in insulated relation on said support, a second movable contact mounted on one end of said second arm, a second fixed contact mounted in insulated relation on said support to cooperate with said second movable contact, said second arm being biased such that said second movable contact is normally spaced from said second fixed contact, an operating lever pivotally mounted on said support and having means formed thereon for controlling said main switch, said operating lever having an "off" position wherein said lever means engages said first flexible contact arm to hold said first movable contact away from said first fixed contact and an "on" position wherein said lever means permits said first movable contact to engage said first fixed contact and said lever means further engages said second flexible contact arm causing said second movable contact to engage said fixed contact, manual means for moving said operating lever into its "on" position, latch means mounted on said support for holding said lever in the "on" position, and automatic means for opening said main switch.

6. An electric appliance having a mechanism for controlling its operation comprising: a support, a double pole main switch for controlling the energization of said appliance, said main switch including a first flat flexible contact arm, a first movable contact mounted on one end of said first arm, a first fixed contact mounted in insulated relation on said support to cooperate with said first movable contact, said first arm being self-biased such that said first movable contact normally engages said first fixed contact, a second flat flexible contact arm, a second movable contact mounted on a movable portion of said second arm, a second fixed contact mounted in insulated relation on said support to cooperate with said second movable contact, said second arm being self-biased such that said second movable contact is normally spaced from said second fixed contact, said contact arms being mounted in insulated relation on said support with their flat surfaces in perpendicular relation to the support and with the flat surfaces positioned in mutually spaced generally parallel relation, an operating lever pivotally mounted on said support and having means formed thereon and extending between said contact arms for controlling said main switch, said operating lever having an "off" position wherein said lever means engages said first flexible contact arm to hold said first movable contact away from said first fixed contact and an "on" position wherein said lever means permits said first movable contact to engage said first fixed contact and said lever means further engages said second flexible contact arm causing said second movable contact to engage said fixed contact, and manual means for moving said operating lever into its "on" and "off" positions.

7. In an electric appliance, a mechanism for controlling the appliance operation comprising: a plate-like support, a double pole main switch for controlling the energization of said appliance, said main switch including a first flexible contact arm mounted in insulated relation on said support to flex in a plane generally parallel to said support, a first movable contact mounted on one end of said first arm, a first fixed contact mounted in insulated relation on said support to cooperate with said first movable contact, a second flexible contact arm mounted in insulated relation on said support and vertically spaced from said first arm to flex in the same plane as the first arm, a second movable contact mounted on one end of said second arm, a second fixed contact mounted in insulated relation on said support to cooperate with said second movable contact, an operating lever mounted on said support to move in a plane generally parallel to the support, said lever having insulated means formed thereon extending between said contact arms for controlling said main switch, said operating lever having an "off" position wherein said insulated means engages said first flexible contact arm to hold said first movable contact away from said first fixed contact and an "on" position wherein said insulating means permits said first movable contact to engage said first fixed contact and said insulating means further engages said second flexible contact arm causing said second movable contact to engage said fixed contact, and manual means for moving said operating lever into its "on" position.

8. A toaster having a mechanism for controlling the toasting operation comprising: a support, a bimetallic element pivoted at one end to said support, means for heating said bimetallic element electrically connected to a means for heating said toaster, a double pole main switch for controlling the energization of said bimetallic heating means and said toaster heating means, said main switch including a first flexible contact arm mounted at a point intermediate its ends in insulated relation on said support, a first movable contact mounted on one end of said first arm, a first fixed contact mounted in insulated relation on said support to cooperate with said first movable contact, said first arm being biased such that said first movable contact normally engages said first fixed contact, a second flexible contact arm mounted in insulated relation on said support, a second movable contact mounted on one end of said second arm, a second fixed contact mounted in insulated relation on said support to cooperate with said second movable contact, said second arm being biased such that said second movable contact is normally spaced from said second fixed contact, an operating lever pivotally mounted on said support and having means formed thereon for controlling said main switch, said operating lever having an "off" position wherein said lever means engages said first flexible contact arm to hold said first movable contact away from said first fixed contact and an "on" position wherein said lever means permits said first movable contact to engage said first fixed contact and said lever means further engages said second flexible contact arm causing said second movable contact to engage said fixed contact, manual means for moving said operating lever into its "on" position, latch means mounted on said support for holding said lever in the "on" position, a shorting switch for bypassing said bimetallic heating means including a third movable contact mounted on the opposite end of said first contact arm and a mating contact mounted in insulated relation on said support, said first arm being biased such that said third movable contact normally engages said mating contact, means controlled by said operating lever for engaging said first arm to hold said third movable contact out of engagement with said mating contact, means responsive to the movement of said bimetallic element caused by heating the element for permitting said shorting switch to close thereby de-energizing said bimetallic element heating means and means responsive to the movement of said bimetallic element caused by the cooling of the element for unlatching said operating lever thereby opening said main switch and terminating said toasting cycle.

9. In an electric appliance, means for furnishing heat to the appliance, a control box, an integrated control assembly positioned within said control box for controlling said appliance, said assembly comprising: a plate-like vertically positioned support, first and second terminal members each having vertical portions mounted in spaced insulated relation on said support, each of said members having a lower horizontally extending portion forming a terminal for connection to an electric power cord, said terminals being positioned in close relation adjacent the rear lower portion of said control box to facilitate connection to the power cord, each of said terminal members having an upper horizontally extending portion with said upper portions being positioned in generally parallel vertically spaced relation, a double pole main switch for controlling the energization of said heating means, said main switch including a first flat flexible contact arm, a first movable contact mounted on said first arm, a first fixed contact mounted on said upper horizontally extending portion of said first terminal member to cooperate with said first movable contact, a second flat flexible contact arm mounted in insulated relation on said support in vertically spaced relation with said first contact arm, a second movable contact mounted on a movable portion of said second arm, a second fixed contact mounted on said upper horizontal portion of said second terminal member to cooperate with said second movable contact, and a manually movable operating lever pivotally mounted on said support and having means formed thereon for cooperating with said flexible contact arms to control said main switch.

10. In an electric appliance, means for furnishing heat to the appliance, a control box positioned on one end of the appliance, an integrated assembly for controlling the appliance operation positioned within said control box and comprising: a plate-like vertically positioned support, first and second terminal members mounted in spaced insulated relation on said support, each of said members having a lower horizontally extending portion forming a terminal for connection to an electric power cord, said terminals being positioned adjacent an exterior wall of said control box to facilitate connection to the power cord wires, said first terminal member having an upper horizontally extending portion, a main switch for controlling the energization of said heating means, said main switch including a first flat flexible contact arm, a first movable contact mounted on said first arm, a first fixed contact mounted on said upper horizontally extending portion of said first terminal members to cooperate with said first movable contact, means connecting said second terminal member to said appliance heating means, a manually movable operating lever pivotally mounted on said support and having means formed thereon for cooperating with said flexible contact arm to control said main switch, and a heat-up, cool-down type timer mounted on said support for automatically controlling said operating lever to open said main switch after a predetermined time interval, said timer including a bimetallic element mounted in insulated relation on said support, means for heating said element electrically connected to said appliance heating means, and a shorting switch for bypassing said element heating means including a second flexible contact arm mounted in insulated relation on said support in vertically spaced relation with said element, a second movable contact mounted on said second arm, and a mating contact mounted in insulated relation on said support to cooperate with said second contact.

11. In an electric appliance, means for furnishing heat to the appliance, an insulated housing positioned on one end of the appliance, an integrated assembly for controlling the appliance operation positioned within said housing and comprising: a plate-like vertically positioned support, first and second terminal members mounted in spaced insulated relation on said support, each of said members having a lower horizontally extending portion forming a terminal for connection to an electric power cord, said terminals being positioned adjacent the rear lower portion of said housing to facilitate connection to the power cord wires, each of said terminal members having an upper horizontally extending portion with said upper portions being positioned in vertically spaced relation, a double pole main switch for controlling the energization of said heating means, said main switch including a first flat flexible contact arm, a first movable contact mounted on said first arm, a first fixed contact mounted on said upper horizontally extending portion of said first terminal member to cooperate with said first movable contact, a second flat flexible contact arm mounted in insulated relation on said support in vertically spaced relation with said first contact arm, a second movable contact mounted on a movable portion of said second arm, a second fixed contact mounted on said upper horizontal portion of said second terminal member to cooperate with said second movable contact, a manually movable operating lever pivotally mounted on said support and having means formed thereon for cooperating with said flexible contact arms to control said main switch, and a heat-up, cool-down type timer mounted on said support for automatically controlling said operating lever to open said main switch after a predetermined time interval, said timer including a bimetallic element mounted in insulated relation on said support, means for heating said element electrically connected to said appliance heating means, and a shorting switch for bypassing said element heating means including a third flexible contact arm mounted in insulated relation on said support in vertically spaced relation with said element, a third movable contact mounted on said third arm, and a mating contact mounted in insulated relation on said support to cooperate with said third contact.

References Cited by the Examiner

UNITED STATES PATENTS

| | | | |
|---|---|---|---|
| 2,250,997 | 7/41 | Miller | 219—493 |
| 2,318,761 | 5/43 | Curtis | 200—166.1 |
| 2,584,725 | 2/52 | McNairy | 99—329 |
| 2,611,835 | 9/52 | Mossman | 200—166.1 |
| 2,774,836 | 12/56 | Powers | 200—166.1 |
| 2,969,010 | 4/59 | Andrews | 99—329 |
| 3,119,000 | 1/64 | Loch et al. | 99—329 |

RICHARD M. WOOD, *Primary Examiner.*

LAWRENCE CHARLES, *Examiner.*